W. H. SIBBALD.
ATTACHMENT FOR INTERNAL COMBUSTION ENGINES.
APPLICATION FILED JAN. 18, 1917.
1,336,592. Patented Apr. 13, 1920.
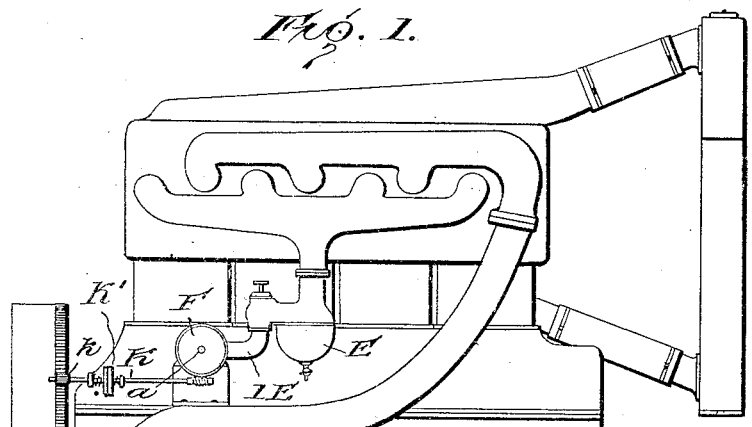
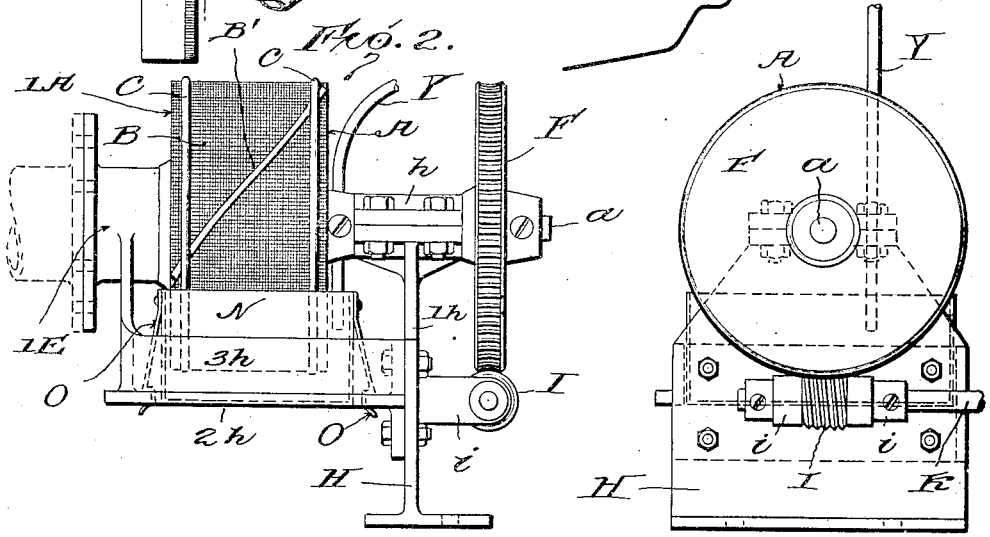
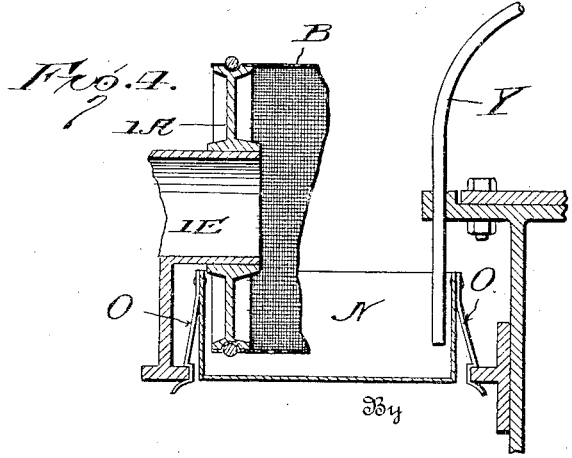
William H. Sibbald, Inventor
By Edward E. Clement, Attorney

UNITED STATES PATENT OFFICE.

WILLIAM H. SIBBALD, OF MINOT, NORTH DAKOTA, ASSIGNOR TO EDWARD E. CLEMENT, OF WASHINGTON, DISTRICT OF COLUMBIA.

ATTACHMENT FOR INTERNAL-COMBUSTION ENGINES.

1,336,592.     Specification of Letters Patent.     Patented Apr. 13, 1920.

Application filed January 18, 1917. Serial No. 143,029.

*To all whom it may concern:*

Be it known that I, WILLIAM H. SIBBALD, a citizen of the United States, residing at Minot, in the county of Ward, State of North Dakota, have invented certain new and useful Improvements in Attachments for Internal-Combustion Engines, of which the following is a specification, reference being had therein to the accompanying drawing.

My invention relates to internal combustion engines, with particular reference to automobile engines. It has for its object the provision of means for increasing the power of an engine by increasing the effect of the explosions in its cylinders. I have found by experience that when operated in a damp atmosphere, an engine will develop greater power than when only dry air is supplied for combustion. Furthermore, my experiments have led me to the conclusion that it is desirable not merely to moisten the explosive mixture, but that it should be charged with vapor to the point of saturation. My theory is that in the explosion, this saturated vapor mixture, in addition to other effects, produces a considerable quantity of steam, the expansion of which supplements the direct effect of the gaseous explosion.

As it is vitally necessary for successful operation that the automobile power plant should be self-contained and self operated, in all particulars, I attain my object by mounting upon the power plant, so as to form a part thereof, a mechanical device to be presently described, adapted to contain any desired quantity of water, to heat the same, and by power driven means to circulate the heated water in the path of the air or mixture passing to the carbureter or intake manifold. This device is connected to be mechanically driven from the engine itself and is preferably heated by means of the exhaust.

For the sake of simplicity, I shall illustrate and describe my invention herein specifically as attached to the air intake of the carbureter and provided with a rotating screen connected to a moving part of the engine to be driven thereby, said screen constantly dipping into a vessel of water and carrying a film of the same in its meshes throughout its travel so that all air passing to the intake is forced to come into contact with the heated aqueous film. Vaporization and thorough mixture of aqueous vapor with the air are attained by this means, regardless of the temperature of the external air. I might add that in freezing weather it is particularly important to heat the water, and for this purpose it may be necessary to run the engine without running the drum of the vaporizer. In order to permit this, I provide for slip or temporary disengagement between the driving parts of the engine and of the moistener or vaporizer, which will be particularly described.

My invention is illustrated in the accompanying drawings in which—

Figure 1 is a side view of one type of engine and carbureter with my invention applied thereto.

Fig. 2 is a side view on an enlarged scale of the filter screen and driving parts.

Fig. 3 is an end view of the same.

Fig. 4 is a detail sectional view of the same, with part of the screen broken away.

In the drawing, A is a cast iron disk having a peripheral flange and an axial shaft $a$ which rotates in a journal box mounted upon a vertically extending support $1^h$, forming part of the rigid frame H. The journal box is formed with a cap plate bolted in place, which can be removed to permit the inspection or removal of the shaft and disk A.

$1^A$ is a companion disk (best shown in Fig. 4), having a peripheral flange and a central hub flanged and bored to fit and rotate upon the end of the air intake pipe $1^E$ of the carbureter E. Extending from the disk A to the disk $1^A$, and secured upon both by means of spring steel clamping wires C, is a cylinder B of wire netting or screen cloth. This netting may be of various materials, but I preferably make it of copper, because that metal will not destructively oxidize and needs no protective coating, hence it lends itself to a finer mesh and makes cleaner openings.

The disk A is connected to one end of the shaft $a$ preferably by means of a hub and set screw as shown in Fig. 2, and upon the other end of the shaft is mounted a worm wheel F also shown as having its hub secured by means of a set screw. These connections may of course be varied. Meshing with the worm wheel F, is a worm I, journaled in brackets $i$ secured to the frame H, The worm shaft K is extended (see Fig. 1) to some suitable moving part of the engine by which it is rotated. For purposes of illustration, I have indicated the shaft as supplied with a pinion $k$ meshing into the teeth of the starting gear on the fly wheel of the engine. This gives a double reduction, and even at high engine speeds will produce a sufficiently slow rotation of the cylinder B. In order to prevent undue strain on the wire netting of the cylinder, however, at any speed, I may use one or more diagonal torsion strips B', which take the strain of rotating the disk $1^A$, this of course being the follower disk and driven from the disk A. These two disks may be connected in other ways as for example by longitudinal feather arms or flanged braces or tie rods, or the equivalent.

Beneath the cylinder and inclosing the lower part thereof is a water pan N kept filled to the proper level by water coming into it through the pipe Y, which leads to a closed tank or to a portion of the cooling water system. In order to supply water that is warmed and will readily vaporize for that reason, which is desirable in a cold climate, this pipe may derive its water supply from the water jacket or radiator connections at any suitable point, preferably on the pressure or hot side; and in order to supply the deficiency thus created in the cooling system, I may connect a supply tank by means of a similar pipe to the system, preferably to the lower pipe connection between the radiator and the pump. In this way fresh cold water will be drawn in from the tank and thrown into the water jackets, and a constant pressure supply from the hot side will be furnished to the pipe Y. In order to regulate the amount drawn through the pipe, the latter may be supplied with a suitable valve, or a constrictor to regulate the diameter of its bore at some point. In some cases it is possible, especially where the atmosphere is not perfectly dry, to make the water pan large enough so that it will hold a sufficient supply for a considerable mileage; but in arid regions, as for example in desert country, and also in day driving in high altitudes, it will be found that a great deal of moisture will be taken up, and more water will be required than can be carried in a small pan. In such case an auxiliary reservoir connected to the pan or an arrangement such as that which I have already described, must be provided to maintain the supply of moisture.

The water pan is shown supported upon a horizontal bracket $2^h$ connected on one side to the vertical part $1^h$ and on the other side with the intake $1^E$. In manufacturing the device, in this form, the parts $1^E$, $2^h$ and $1^h$, with the base of the frame H, and lower section of the shaft journal box, would all be cast integral, or formed in at most two parts bolted together as shown in Fig. 2. Thus the bracket $2^h$ which has side flanges $3^h$, forms a connecting bridge for the intake and the shaft bearing, and by its stiffness maintains the same in axial alinement, and thereby maintains the two disks A and $1^A$ concentric.

The assembly of this device is best shown in Fig. 1, where it is attached to the bed plate of the engine, and connected up to the intake $1^E$ of the carbureter E. The power is supplied as already stated from the starting gear on the fly wheel.

The operation of the device is apparent from the drawings and the foregoing description, and may be briefly summarized as follows: The rotation of the worm wheel F rotates the shaft $a$ and with it the two disks A and $1^A$, with the cylinder screen B. The pan N having been supplied with water, the screen in its rotation takes up a film of moisture which is constantly renewed while the engine is running. The entire air supply for the carbureter is drawn in through the screen and through the intake $1^E$, and becomes uniformly and thoroughly impregnated with moisture as it is drawn in.

In Fig. 4 I have shown somewhat in detail a preferred method of attaching the water pan N. The bracket $2^h$ is provided with a central opening of sufficient dimensions to permit the pan to pass through it. The pan is inserted upwardly through this opening and retained in position by means of spring latches O, taking over the edges of the opening.

It should be understood that this description and illustration are made specific for clarity of definition, and not as a matter of limitation. A number of modifications, principally in the arrangement and application of the device, are possible, and will readily occur to those skilled in the art. For example, as I have already mentioned, this device may be inserted between the carbureter and the engine, in order to moisten the mixture supplied to the latter instead of introducing the moisture initially into the carbureter. For such a connection it is necessary to inclose the screen, preferably by extending the walls of the water pan up and around it to form a complete shell, through the ends of which the shaft $a$ and the pipe $1^E$ protrude. An intake opening from the carbureter must be provided for this shell, and the openings through which the shaft and the outlet protrude must be provided with suitable glands or packing to prevent air leakage. With such an arrangement the moisture is driven into the engine from the carbureter through the shell of this moistening device, entering the same outside of the screen, and being moistened as it is drawn in through the screen and so into the engine.

My cylindrical screen of fine mesh I have found to be an excellent dust filter. Even a rather coarse mesh when sufficiently moistened will remove practically all of the dust and prevent its passage to the carbureter of the engine. For this purpose alone, in dusty regions and particularly in those afflicted with alkali dust, the device is of special value, and its dual function, by supplying the engine under all circumstances with a clean, dustless, moist mixture, produces perfect combustion, increased engine efficiency, and very little deposit of carbon in the cylinders.

Another example of a modification having certain obvious advantages, is the provision of a water jet, or spray, or dripping pan, adapted to project water upon the screen instead of having the latter pass through the water. With such an arrangement, the screen itself may remain stationary, or may be oscillated, or otherwise moved, instead of being continuously rotated, the principal desideratum being to produce a film of moisture over the entire surface with approximate uniformity. Where a constant spray or jet is used, it is of course necessary to cut off the supply when the engine is not running, and for this purpose I contemplate a spring cam clip connection either in the worm shaft or between the large worm gear and the screen shaft $a$. Such clips are well known to mechanics, and comprise one element fixed to the shaft, and the other connected to it by a cam surface traveling on a pin or complementary cam surface, with a spring normally holding the cam element back in normal position on the driving end of the shaft. When this is turned therefore, so as to bring strain on the connection between the cams, the driving part of the cam is thrown forward against the spring tension by the pin traveling in the slot or the surfaces traveling on each other, so that before the screen shaft or screen would be turned, the cam would move longitudinally through a sufficient path of travel to operate a cock in the water pipe and turn on the water. Obviously a manual cock may also be employed if desired.

In order to heat the water in the pan, the exhaust pipe of the engine is carried thereto, and either passed immediately beneath it, or otherwise attached. The simplest form of connection is illustrated in Fig. 1, but other methods of attaching, by means of a jacket or the like, in order to more fully utilize the heat from exhaust, may be employed if desired. In order to provide for slip between the gear wheel F and the pinion $k$ or the worm I, in order to start the engine without turning the gear wheel F, in case the water in the pan happens to be frozen, I insert a friction coupling K', in the shaft K. The coupling will ordinarily transmit sufficient power to turn over the screen cylinder, but if the latter should happen to be rigidly fixed, its element of the coupling and its end of the shaft K will remain quiescent while the pinion $k$ and its end of the shaft will be free to rotate. The degree of pressure between the elements of the coupling will of course determine the amount of friction and the amount of power to be transmitted. I may also provide a drop bearing for the worm end of the shaft K, having sufficient play so that the worm may be thrown out of mesh with the gear F when the engine is not running. This action should preferably be automatic, and the reëngagement should be manual, so that the engine cannot be accidentally started without throwing out the worm, if the water is frozen. The drop bearing referred to may be pivoted on the frame H, taking the place of the bearing frame $i$. The same result may be accomplished by cutting the bevel of the pinion $k$ on a bevel or slant or curve, especially as the teeth of some starting gears are now cut in that way. The result of this oblique engagement of the pinion and gear is that if the engine should start running while the moistener is frozen, the teeth of the gear would act like cams to push the pinion endwise out of engagement. In order to permit this, the shaft K must have endwise motion in its bearings, with a retractile spring to spring it back and a spline or feather connection with the worm I, so that it can slide therethrough.

Having thus described my invention what I claim and desire to secure is:

1. A gas power plant comprising an internal combustion element with a moving part driven thereby, a source of fuel supply therefor, a mixer or carbureter adapted to mix said fuel with air and supply it to the internal combustion element as a properly proportioned explosive mixture, means for carrying off the exhaust gases from said internal combustion element, a receptacle containing water arranged to be heated by said exhaust means, an air intake opening or nozzle for said carbureter, and a rotatable screen or filter journaled concentrically with said air inlet and surrounding the same so that all the air passing into the inlet must pass through the screen, said screen dipping into said water receptacle so as to be constantly moistened by water therein, and a shaft for said screen or filter connected through gears with the said driven moving part, with means interposed in said shaft responsive to abnormal resistance to movement on the part of the screen, as for example when the water is frozen, and automatically acting thereupon to disconnect the screen from the driven moving part, so as to permit the starting of the engine without rotating the screen or filter until the heated exhaust gases shall have liquefied the water.

2. In combination with a gas engine having a carbureter and an air inlet for the same, an air moistener and filter comprising the following instrumentalities: a U-shaped frame carrying a shaft bearing on one of its vertical members and concentrically therewith carrying on the other member a coupling for attachment to the carbureter, a shaft in said bearing, a worm gear attached to the outer end of said shaft, a worm and a transverse shaft carrying the same journaled on the frame with the worm in engagement with the worm gear, a water pan supported in the bottom of the U-shaped frame, a cylindrical screen or folder secured upon and concentrically with the shaft and air inlet opening, so as to dip into the water pan, driving gear connections from the engine to said transverse shaft, and an automatic pressure operated slip coupling in said transverse shaft, whereby the air filter and moistener is rotated with relative slowness when the engine is running, but may remain stationary without damage under abnormal conditions.

In testimony whereof I affix my signature.

WILLIAM H. SIBBALD.